Patented May 22, 1951

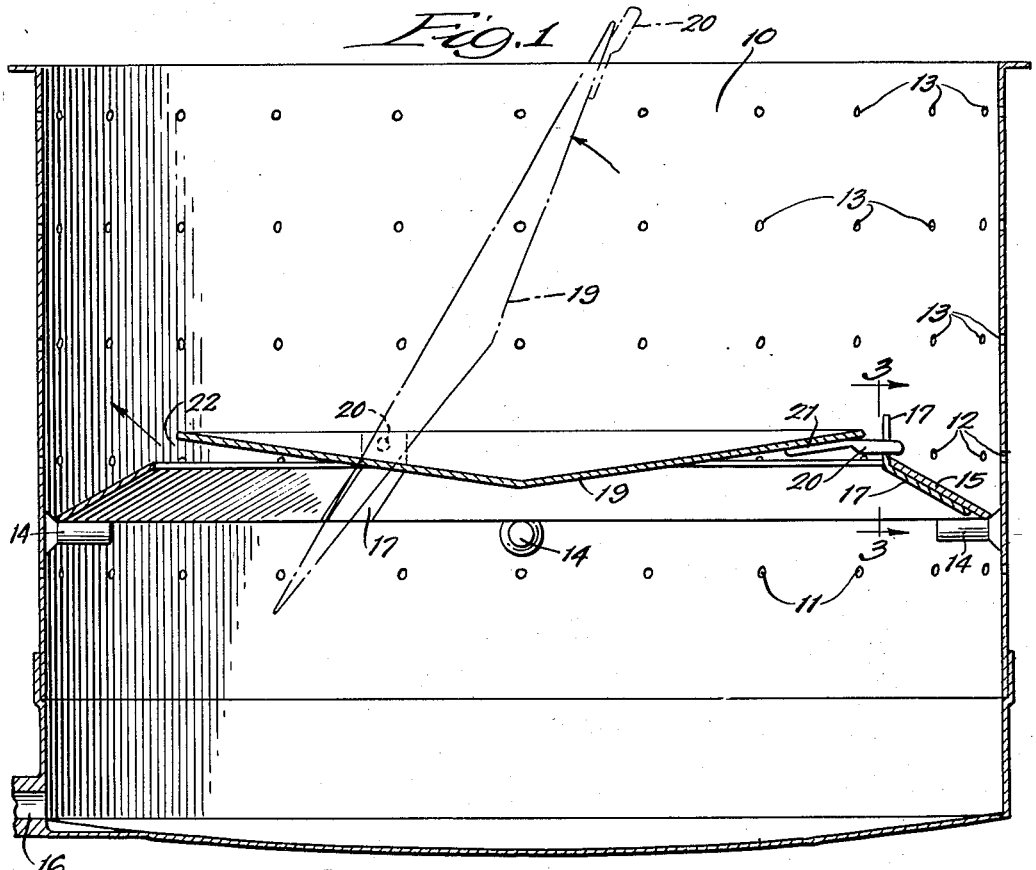
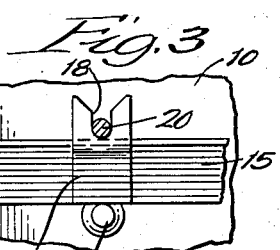
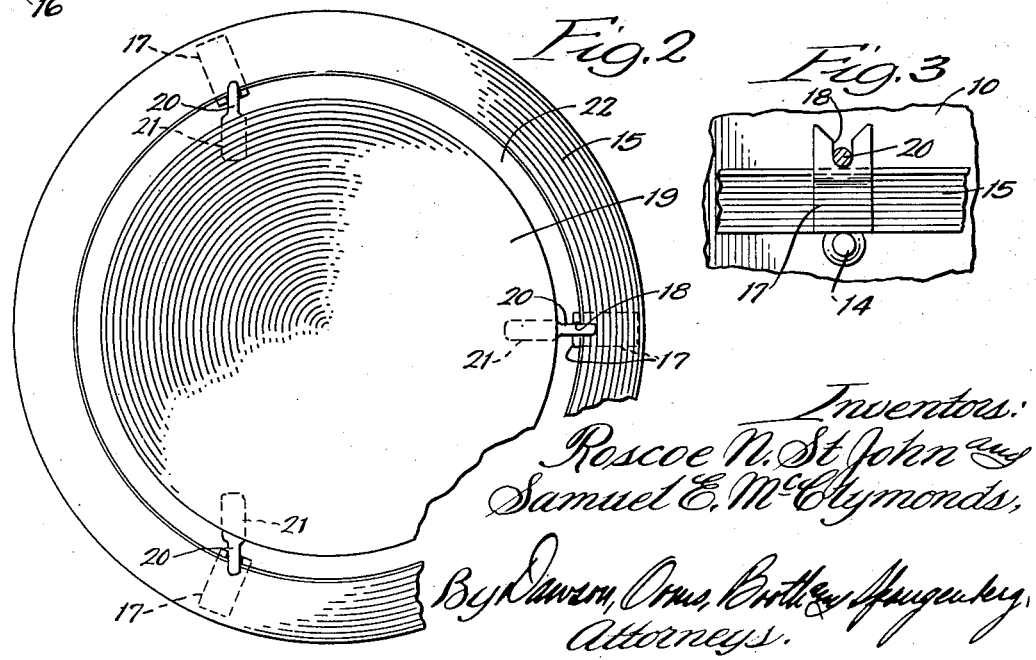

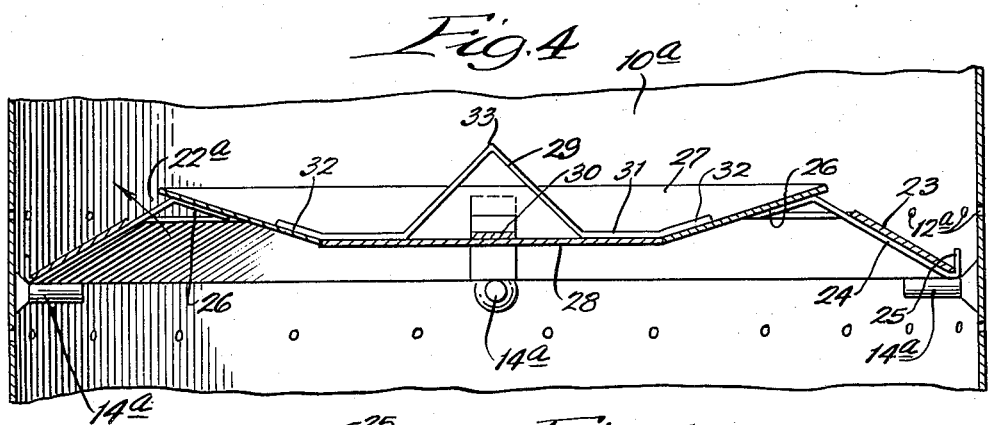
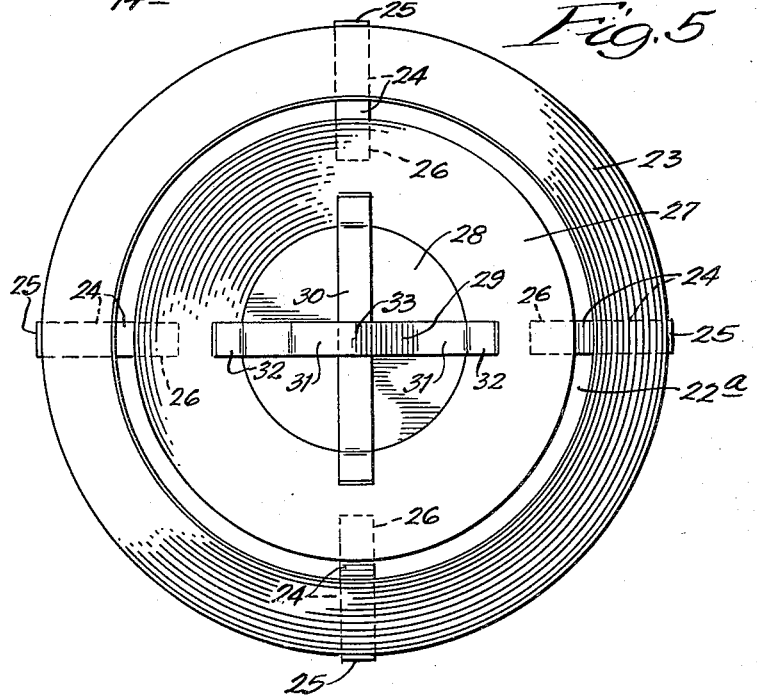

2,554,474

UNITED STATES PATENT OFFICE 2,554,474

VAPORIZING TYPE BURNER AND PILOT RING STRUCTURE

Roscoe N. St. John and Samuel E. McClymonds, Jr., Wichita, Kans., assignors to The Coleman Company, Inc., Wichita, Kans., a corporation of Kansas Application May 22, 1948, Serial No. 28,694

7 Claims. (Cl. 158—91)

This invention relates to a heater and pilot ring structure. The invention is particularly useful in connection with a pot type burner equipped with a pilot ring structure supported within the pot casing at an intermediate point.

An object of the invention is to provide in a pot type burner, and the like, a pilot ring structure which is effective for directing an unburned gas-air mixture upwardly along the side walls of the pot where it meets primary air jets, while at the same time preventing the dropping of cold air into the lower pot section and providing for the better mixing of fuel vapors in the area below the pilot ring structure. A still further object is to provide a burner pot casing and pilot ring structure which are effective for bringing an annulus of unburned gas-air mixture into counterflow contact with air jets to bring about effective mixing of the air with such mixture. A still further object is to provide a pot burner structure equipped with a pilot ring, in which the pilot ring provides a baffle for preventing the dropping of cold air into the lower pot section at low oil rates, while serving, at higher oil rates, as a shield for the pot bottom and lower pot sections against direct flame radiation from the flame in or above the upper portion of the burner and while serving itself as a radiator of the longer red and infra red heat rays to keep the lower pot section hot. A still further object is to provide a novel pilot ring structure arranged for deflecting the unburned gas-air mixture in a desired direction, while providing a central baffle which is removable or tiltable to provide access to the burner pot bottom for starting the fire. Other specific objects and advantages will appear as the specification proceeds.

The invention is illustrated, in preferred embodiments, by the accompanying drawings, in which—

Figure 1 is a vertical sectional view of a pot burner structure and pilot ring structure embodying our invention; Fig. 2, a broken top plan view; Fig. 3, a sectional detail view, the section being taken as indicated at line 3 of Fig. 1; Fig. 4, a view similar to Fig. 1, but showing a modified form of pilot ring structure; and Fig. 5, a top plan view on a reduced scale of the structure shown in Fig. 4.

In the structure shown in Figs. 1 to 3, inclusive, 10 designates the casing providing the pot for a pot type burner. The pot casing 10 is provided with a plurality of lower air ports 11, an upper row of ports 12, and above ports 12 are shown other rows of ports 13 which are in vertically-spaced relation to air ports 12.

Between the ports 11 and 12, the pot casing 10 is provided with inwardly-extending lugs or pins 14, which provide a support for a pilot ring 15. At its bottom, the pot casing 10 is provided with an inlet pipe 16 for introducing oil into the bottom of the pot burner.

The pilot ring 15 is shown in the form of a ring having an upwardly- and inwardly-inclined wall. Secured to the underside of the ring 15 are three support strips 17, which may be welded or otherwise secured to the ring 15, and the strips 17, at their top, are turned upwardly, and each is provided with a notch 18, as shown more clearly in Figs. 1 and 3.

Supported upon the strips 17 and 18 is a centrally-positioned baffle plate 19. In the specific illustration given, the plate 19 is dished centrally, and is provided near its periphery with three support fingers 20 adapted to be received by the strips 17 and 18. The fingers 20, preferably, have their rear portions 21 flattened and secured by spot welding or other means to the underside of the plate 19, as shown best in Fig. 1.

As shown in Fig. 2, two of the fingers 20 are mounted opposite each other at one side of center of the plate 19, while the other finger 20 extends in a direction at right angles to a line connecting the oppositely-disposed fingers. The first two fingers, therefore, provide a pivot structure upon which the plate 19 may swing, as illustrated best, in dotted lines, in Fig. 1. As shown best in Fig. 1, the plate 19 has peripheral edge portions inclined upwardly and outwardly so as to form a deflector for directing the gas and air mixture outwardly toward the side walls of the pot casing 10 and adjacent the ports 13.

At the same time, the row of ports 12 is so located as to direct air jets directly into the space 22 provided between the upper edge of the ring 15 and the periphery of the plate 19. Preferably, the openings are so located as to direct the air jets from ports 12 in a countercurrent flow against the gas stream emerging from such space so as to cut through the gas stream. The openings 12 may be directed inwardly in a horizontal plane so as to strike the baffle plate 19 and be deflected downwardly or, if desired, the openings 12 may be downwardly inclined so as to direct air jets downwardly through the space 22 between the periphery of plate 19 and the upper edge of ring 15.

Operation

In the operation of the structure shown in Figs.

1 to 3, inclusive, the plate 19, which is hinged off center, as shown best in Fig. 2, may be raised up at the edge of the plate opposite hinge fingers 20 so as to expose the bottom of the burner, as shown in dotted lines in Fig. 1. A lighted paper, etc. may then be dropped through this opening into the bottom of the burner. If desired, the lighted paper may be dropped onto the hinged plate 19, and by means of a metal rod, etc., the back edge of the plate adjacent the hinge fingers, may be depressed to swing the plate into the position shown in dotted lines in Fig. 1, thus causing the lighted paper to drop into the lower part of the pot for the purpose of igniting fuel oil admitted through inlet pipe 16. In this operation, the dished central portion of the plate 19 serves to hold the lighted paper until the plate is tilted.

After the plate is returned to its normal position as shown in Fig. 1 the lighted paper absorbs some of the liquid fuel which is vaporized and burned in the presence of air admitted through the lower air ports 11 (Fig. 1). The heat thus produced vaporizes additional fuel oil and the vapors thus formed are partially mixed with air entering through ports 11. As the gas-air mixture thus formed rises in the burner it contacts the lower surface of the baffle 19 and is directed outwardly toward the burner side wall and the air ports 12 and 13. Here an effective mixing of the gas air mixture with additional air entering through ports 12 and 13 is brought about.

The plate 19 serves to prevent the dropping of cold air into the lower pot section and permits the use of lower pilot fire oil rates. At higher oil rates, the baffle shields the pot bottom from direct short wave flame radiation while it is serving as a radiator of longer wave length or heat rays to keep the lower pot section hot. Further, the directing of air from the ports 12 directly into the space 22 through which the gas and air mixture stream is emerging, provides an excellent mixing of fuel vapors and air below the pilot ring due to the action of the air jets from ports 12 cutting through the gas and air stream. The structure increases the range of blue flame pilot operation by providing more air below the pilot ring for combustion there.

In the tilting of the plate 19, as has been heretofore described, the notched vertical wall of the strip 17 has upper inclined edges which receive the circular fingers 20 and guide them easily into the centered position illustrated.

In the modification shown in Figs. 4 and 5, the ring member 23 is provided with spacer strips 24. The spacer strips 24, preferably, have an upwardly-turned end portion 25, and at the opposite end, extend beyond the ring 23 and are then turned downwardly at 26.

Resting upon the downwardly-turned end portions 26 is a plate or baffle member 27, having an upwardly-inclined wall and a central opening normally closed by a cap 28. The cap 28 is provided with metal strips 29 and 30. The strips 29 and 30 are at right angles to each other and each has a portion 31 secured to the cap 28 and with a free portion 32 resting upon the inclined wall of baffle 27. The strip 29 is upwardly pitched in its central portion to provide a handle portion 33 (Fig. 5). Thus, with a hook, the handle 33 may be readily engaged and the cap 28 lifted from its position upon the inclined wall of baffle 27 to open the center of the baffle and thus to provide access to the bottom of the pot burner for lighting the fire.

In the operation of the structure shown in Figs. 4 and 5, the handle portion 33 of the cap 28 may be engaged by a hook and lifted to expose the opening in baffle 27. A lighted ball of paper may then be dropped into the opening to light oil admitted to the bottom of the pot through oil inlet 16. Upon release of the cap handle 33, the inclined supports 32 slide upon the inclined walls of the baffle plate 27 to center the cap in its position, as illustrated in Figs. 4 and 5.

The rising air and gas mixture from the bottom of the pot passes upwardly and is deflected outwardly through the space 22a. At the same time, air from the ports 12a is directed downwardly through the opening 22a into the space below the baffle 27. The burner operation which follows is very similar to that already described in connection with the structure of Figs. 1 to 3, inclusive.

While, in the foregoing specification, we have set forth two embodiments in considerable detail for the purpose of illustrating the invention, it will be understood that such details of structure may be varied widely by those skilled in the art without departing from the spirit of our invention.

We claim:

1. A baffle plate structure, comprising an outer ring, a baffle plate within said ring and spaced therefrom, said plate being dished downwardly, and means for tiltably supporting said plate upon said ring, said means comprising two oppositely-disposed off-center lugs and a third lug extending in a direction at right angles to those of said first-mentioned lugs, said lugs being fixed to said plate and extending therefrom, and said ring being equipped with support means having recesses for receiving said lugs.

2. A pilot ring structure, comprising an outer ring upwardly inclined, a dished plate spaced from said outer ring, spacer members supporting said outer ring and plate to provide an annular opening therebetween, said dished plate being provided with a central opening, a cap closing said opening, and metal straps secured to said cap and having free portions resting upon the inclined upper face of said plate, said straps extending upwardly at their central portions to provide a short handle extension.

3. In a pot type burner, a pot casing providing a side wall and a bottom wall, said side wall having a plurality of air ports therein, a pilot ring supported in said casing below at least some of said ports and comprising a ring extending inwardly and upwardly, and a baffle plate carried by said ring and having an upwardly and outwardly inclined peripheral portion spaced from said ring to provide a vapor port through which vapors may pass from the lower portion of the casing into the upper portion of the casing, the peripheral portion of said baffle plate extending partially above said port to direct the vapors toward the air ports in said casing.

4. In a pot type burner, a casing providing an annular side wall and a bottom therefor, said side wall having a plurality of spaced air ports therein, a pilot ring supported in said casing below at least some of said ports and comprising a ring extending inwardly from the casing wall at an upward inclination and providing a central opening toward which vapors from the fuel are directed, and a baffle plate carried by said ring and having an upwardly and outwardly inclined peripheral portion spaced from said ring to provide a vapor port, said peripheral portion of the baffle plate extending partially over said port to direct vapors outwardly against the port-provided casing.

5. In a pot type burner, a pot casing having an annular side wall and a bottom wall therefor, said side wall being provided with vertically-spaced air openings, a pilot ring supported in said pot casing above at least some of said openings, said ring structure comprising a plate having its outer edge adjacent the side wall of the casing and having its remaining area pitched upwardly and inwardly to provide an annular opening for directing fuel vapors toward the center of the casing, and a baffle plate supported for closing the central portion of said opening and having an inclined peripheral portion spaced upwardly from the inner edge of said ring to provide a vapor port, said inclined peripheral portion of the baffle plate serving to divert the vapors outwardly against the side wall of the casing, said side wall of the casing having some of its air openings directed inwardly into the vapor port to direct air thereinto.

6. In a pot type burner, a pot casing having a side wall and a bottom wall therefor, said side wall of said casing having a plurality of vertically-spaced air openings therein, a pilot ring supported below at least some of said openings and comprising a ring having its outer edge adjacent the casing and extending inwardly and upwardly toward the center of the casing to provide an annular opening, a closed baffle plate closing said opening except for an annular port between the outer peripheral portion of the baffle plate and the inner edge of the ring, said baffle plate having its peripheral portion extending upwardly and outwardly to reverse the direction of flow of the vapors directed inwardly by the ring so that the vapors move outwardly against the wall of the casing.

7. A pilot ring structure, comprising an outer ring adapted to be supported in a pot casing and inclined inwardly and upwardly, spacer members secured to said outer ring and extending inwardly thereof, a dished plate secured to said spacer members inwardly of said outer ring and providing an annular opening therebetween, said dished plate being provided with a central opening, a cap closing said opening, and metal straps secured to said cap and having free portions resting upon the upper face of said plate, said straps extending upwardly at their central portion to provide a short handle extension.

ROSCOE N. ST. JOHN.
SAMUEL E. McCLYMONDS, Jr.

REFERENCES CITED

The following references are of record in the file of this patent:

UNITED STATES PATENTS

| Number | Name | Date |
|---|---|---|
| 771,860 | Croswell | Oct. 11, 1904 |
| 946,018 | Cornwall | Jan. 11, 1910 |
| 2,169,755 | Breese | Aug. 15, 1939 |
| 2,208,746 | Breese | July 23, 1940 |
| 2,337,088 | Donley | Dec. 21, 1943 |
| 2,361,912 | Breese | Nov. 7, 1944 |
| 2,391,567 | Hager | Dec. 25, 1945 |
| 2,404,039 | Castle | July 16, 1946 |